(12) United States Patent
Guleryuz et al.

(10) Patent No.: US 10,337,568 B2
(45) Date of Patent: Jul. 2, 2019

(54) VIBRATION DAMPER FOR A HYDRAULIC CLUTCH ACTUATOR

(71) Applicant: Ford Global Technologies, LLC, Dearborn, MI (US)

(72) Inventors: Burcu Guleryuz, Istanbul (TR); Berat Toptan, Istanbul (TR); Cagkan Kocabas, Istanbul (TR)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 15/643,215

(22) Filed: Jul. 6, 2017

(65) Prior Publication Data

US 2018/0023636 A1    Jan. 25, 2018

(30) Foreign Application Priority Data

Jul. 22, 2016 (EP) .................................... 16180703

(51) Int. Cl.
*F16D 48/02* (2006.01)
*F16F 13/00* (2006.01)
(Continued)

(52) U.S. Cl.
CPC ............ *F16D 25/14* (2013.01); *F15B 21/008* (2013.01); *F16D 48/02* (2013.01); *F16F 13/007* (2013.01);
(Continued)

(58) Field of Classification Search
CPC .. F16D 25/14; F16D 48/02; F16D 2048/0215; F16D 2300/22; F16F 15/173;
(Continued)

(56) References Cited

U.S. PATENT DOCUMENTS 2,248,030 A * 7/1941 Zwack .................. G01F 15/066
310/104
2,472,609 A * 6/1949 Moore, Jr. ............ F02D 41/185
307/149
(Continued)

FOREIGN PATENT DOCUMENTS

DE          10057822 A1    6/2002
DE     102009049243 A1    5/2010
(Continued)

OTHER PUBLICATIONS

European Patent Office, Extended European Search Report Issued in Application No. 16180703.7, dated Nov. 14, 2016, Germany, 5 pages.

*Primary Examiner* — Jacob S. Scott
*Assistant Examiner* — James J Taylor, II
(74) *Attorney, Agent, or Firm* — Julia Voutyras; McCoy Russell LLP

(57) ABSTRACT

The present disclosure relates to a vibration damper for a hydraulic clutch actuator. The vibration damper comprises a rigid housing comprising a chamber, and an inlet port and an outlet port forming a channel, the channel being in fluid communication with said chamber, and a propeller comprising a plurality of at least two blades, the propeller being rotatably mounted in said chamber, and a spiral torsion spring connected to said propeller in such a way that rotation of the propeller causes winding or unwinding of the spring.

19 Claims, 9 Drawing Sheets

(51) Int. Cl.
*F16F 15/02* (2006.01)
*F16F 15/121* (2006.01)
*F16F 15/129* (2006.01)
*F16F 15/173* (2006.01)
*F15B 21/00* (2006.01)
*F16F 15/16* (2006.01)

(52) U.S. Cl.
CPC .... *F16F 15/022* (2013.01); *F16D 2048/0215* (2013.01); *F16D 2300/22* (2013.01)

(58) Field of Classification Search
CPC .... F16F 15/129; F16F 15/1213; F16F 13/005; F16F 15/162; F16F 13/007; F16F 15/022
USPC ............. 192/109 D; 416/157 B, 203
See application file for complete search history.

(56) References Cited

U.S. PATENT DOCUMENTS

| | | | |
|---|---|---|---|
| 2,602,330 A * | 7/1952 | Kollsman | G01F 1/82 73/861.353 |
| 3,164,019 A * | 1/1965 | Burgwald | G01F 1/206 250/356.1 |
| 5,050,772 A * | 9/1991 | Brane | G01F 1/06 137/624.11 |
| 5,070,983 A | 12/1991 | Leigh-Monstevens et al. | |
| 5,935,007 A | 8/1999 | Yang | |
| 6,742,643 B2 * | 6/2004 | Nix | F16D 25/14 192/109 F |
| 7,021,422 B2 * | 4/2006 | Busold | F16D 21/06 192/113.34 |
| 7,350,354 B2 | 4/2008 | Tulaczko | |
| 8,961,107 B2 * | 2/2015 | Su | F04D 17/16 415/102 |
| 2002/0129603 A1 | 9/2002 | Schorr et al. | |
| 2005/0151802 A1* | 7/2005 | Neese | B41J 2/17513 347/85 |
| 2014/0353098 A1 | 12/2014 | Manuel et al. | |
| 2015/0122605 A1 | 5/2015 | Grossgebauer et al. | |

FOREIGN PATENT DOCUMENTS

| | | | | |
|---|---|---|---|---|
| GB | 191315454 A | * | 7/1914 | ............... F01N 5/00 |
| GB | 744041 A | | 2/1956 | |
| GB | 2169380 A | | 7/1986 | |
| KR | 1020080051521 A | | 6/2008 | |
| KR | 20130116390 A | | 10/2013 | |
| WO | 2008086777 A1 | | 7/2008 | |

* cited by examiner

VIBRATION DAMPER FOR A HYDRAULIC CLUTCH ACTUATOR

RELATED APPLICATIONS

The present application claims priority to European Patent Application No. 16180703.7, filed Jul. 22, 2016. The entire contents of the above-referenced application are hereby incorporated by reference in their entirety for all purposes.

FIELD

The present disclosure relates in general to a vibration damper for a hydraulic clutch actuator, and to a hydraulic clutch actuation system comprising such a vibration damper.

BACKGROUND/SUMMARY

Vehicles may have a hydraulic clutch actuation system with a master cylinder 1 and a slave cylinder 2, as illustrated in FIG. 1, which is a replica of FIG. 1 from U.S. Pat. No. 6,742,643 B2.

When a driver activates a clutch pedal 3, a rod 4 causes a master piston to move into the master cylinder 1, which causes a hydraulic fluid to flow in a hydraulic line 5 towards the slave cylinder 2, where a slave piston moves a second rod 6 outward, which is connected to a lever 7 to engage or disengage a clutch from a flywheel 8, which is connected to a crank 9 of a combustion engine.

Vibrations of the engine (e.g. axial vibrations on the crank 9) are transmitted all the way back via the flywheel 8, lever 7, rod 6, slave cylinder 2, hydraulic line 5, master cylinder 1, rod 4 to the clutch pedal 3, where it may be perceptible by the driver and may even cause acoustic noise. The fluid as well as the tubing can act as transformers for vibrations, which are perceptible at the clutch pedal by the driver.

Several damping devices (also known as "vibration cancellers" or "vibration absorbers") applicable to clutch release systems are described in the art.

DE 10 2009 049 243 A1 discloses a vibration absorber, particularly a hydraulic vibration absorber, for a hydraulic actuation system of a motor vehicle clutch, which has a housing whose internal space is connected with a hydraulic cable of a hydraulic actuation system.

WO 2008/086777 A1 discloses an apparatus for suppressing natural resonances in a hydraulic path which actuates a clutch, wherein a pressure line produces a connection between a master cylinder and a slave cylinder and the apparatus, as a branch line, encloses a fluid column. The frequency of the fluid column can be tuned to the excitation frequency of each drive motor used in the system. The volume of the fluid column acts as a medium for the de-excitation frequency and can be varied by changing the length of the enclosure of the fluid column.

U.S. Pat. No. 7,350,354 B2 discloses a hydraulic actuation apparatus for a motor vehicle clutch, including a master cylinder, a slave cylinder, a hydraulic line connecting the master cylinder to the slave cylinder to form a pressure space, and a damping member arranged in the pressure space for attenuating pressure pulses. The damping member includes a connection channel connected to the main fluid channel and a fluid guide directing fluid from the main fluid channel into the connection channel.

U.S. Pat. No. 6,742,643 B2 discloses a damper for provision in a hydraulic actuator system between the master cylinder and a slave cylinder of the system. The damper includes a housing including a damper port for connection in the system and a diaphragm carried by the housing and co-acting with the housing to define a chamber above the diaphragm and in communication with the damper port so that the diaphragm may deflect in response to vibrations transmitted through the hydraulic fluid in the system to effect damping of the vibrations.

U.S. Pat. No. 5,070,983 discloses a damper which is adapted for installation in a clutch hydraulic actuator system between the master cylinder and slave cylinder and includes a housing, a diaphragm mounted in the housing with its periphery fixed with respect to the housing and having a first face constituting a boundary wall of the hydraulic system so that the diaphragm deflects in response to vibrations transmitted through hydraulic fluid in the system to effect damping of the vibrations.

US 2002/0129603 A1 discloses a device to reduce vibrations in a hydraulic force transfer system which has a master cylinder and a slave cylinder connected with this via a fluid column. The device has a housing and a membrane attached by its edge to the housing. The membrane is pressed, at least in the rest state of the hydraulic force transfer system, by means of a spring element against the direction of the hydraulic pressure on the membrane against a chamber-side support surface.

KR 20130116390 describes an anti-vibration device for a vehicle clutch pedal. The anti-vibration device includes: a valve piston which blocks a flow path while the clutch pedal is in a paused state; and a rubber dynamic damper connected to an oil operation path. Accordingly, the anti-vibration device can reduce the vibration generated during a dynamic state when the clutch pedal is operated and during a static state when the clutch pedal is paused.

KR 1020080051521 A is related to a damper pipe for absorbing vibration of a clutch pedal. To reduce an installation cost and to damp different frequencies of vibration a corrugated damping unit is installed in a hydraulic pipe.

US 2014/0353098 A1 discloses a selectively fixed damper. A lockable damper includes moving a valve assembly together with a piston assembly between a retracted position and extended position relative to a tube, the moving unassisted by the lockable damper.

US 2002/0129603 A1 discloses a device to reduce vibrations in a hydraulic force transfer system. The device has a housing and the membrane delimits a chamber which can be connected via a connection with a master cylinder and via a further connection with a slave cylinder so that the membrane can be hydraulically pressurized by the fluid column between the master cylinder and slave cylinder.

However, the inventors herein have recognized that the vibration dampers described above do not provide damping at more than one resonance frequency. Furthermore, the damping characteristic provided by the vibration damper described in the references above are fixed by design, meaning that the damping behavior of the damper is not user-adjustable.

The inventors herein have recognized the above cited potential issues, and provide systems and methods to at least partially address the issues. In one example, a vibration damper for a hydraulic clutch actuator system includes a rigid housing comprising a chamber, an inlet port and an outlet port and a channel fluidly connecting the inlet port and the outlet port, and a propeller comprising a plurality of blades. The propeller is rotatably mounted in said chamber and the chamber is fluidly connected with the channel in such a way that movement of fluid through the channel causes rotation of the propeller. The vibration damper further includes a spiral torsion spring operatively connected to said propeller in such a way that rotation of the propeller causes winding or unwinding of the spring.

In this way, the vibration damper may reduce vibration by absorbing high frequency vibration energy through the drag force applied by the fluid movement to the propeller blades and absorbing low frequency vibration through the winding and/or unwinding of the torsional spring. Further, by designing a vibration damper which can dampen one or more resonance frequencies, the vibration experienced during different driving conditions may be reduced which further improves the customer's driving comfort. By absorbing the undesired engine vibrations effectively, engine performance may be increased, which may further lead to improved fuel economy and overall increase in engine efficiency.

Thus, the vibration damper presented herein may easily be fine-tuned, not only at design-time, but also after installation, in particular without having to remove the damping device from the hydraulic system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
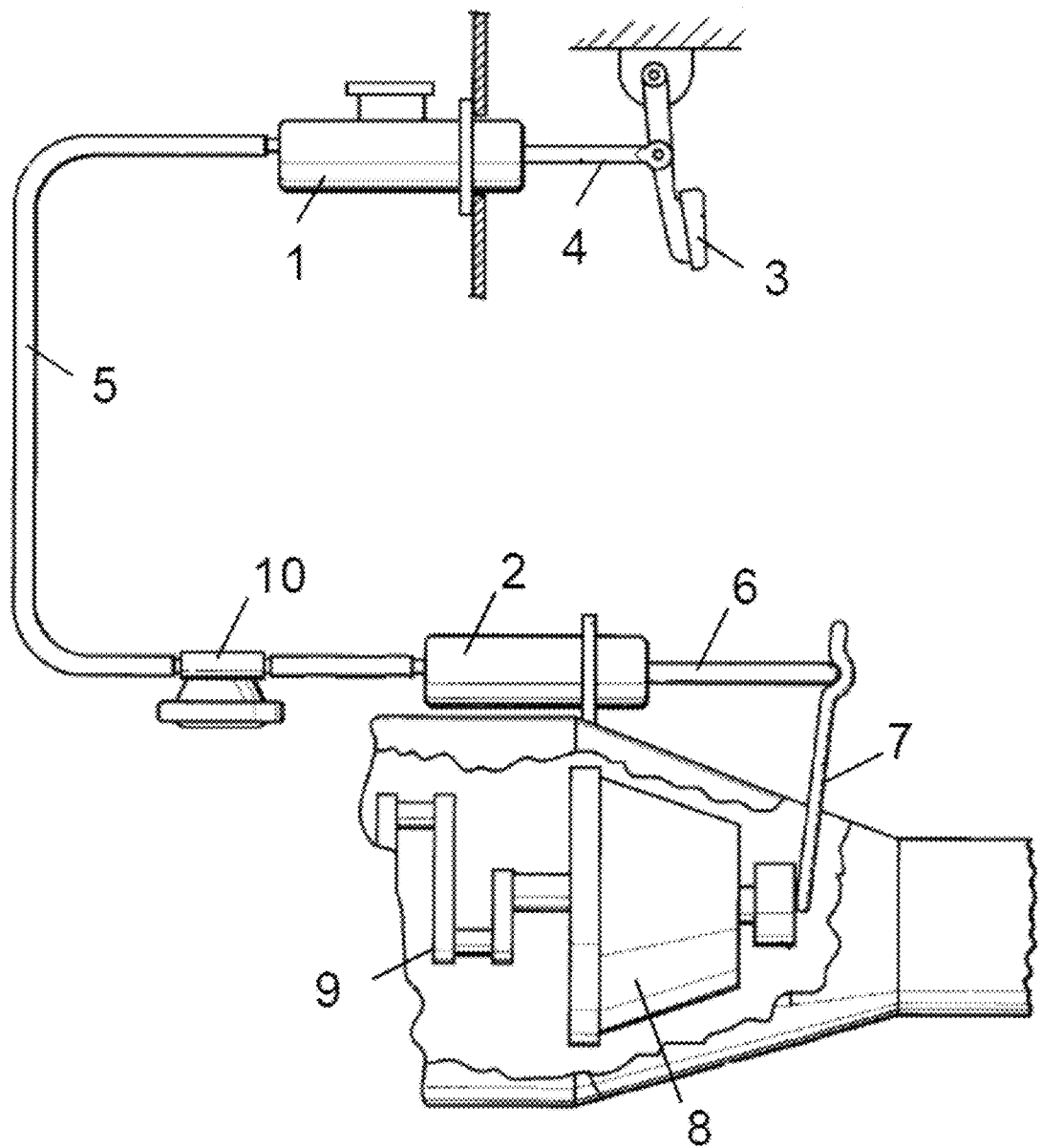
FIG. 1 shows a hydraulic actuator system with a damper arranged between a master cylinder and a slave cylinder, known in the art disclosure.
Figure 2:
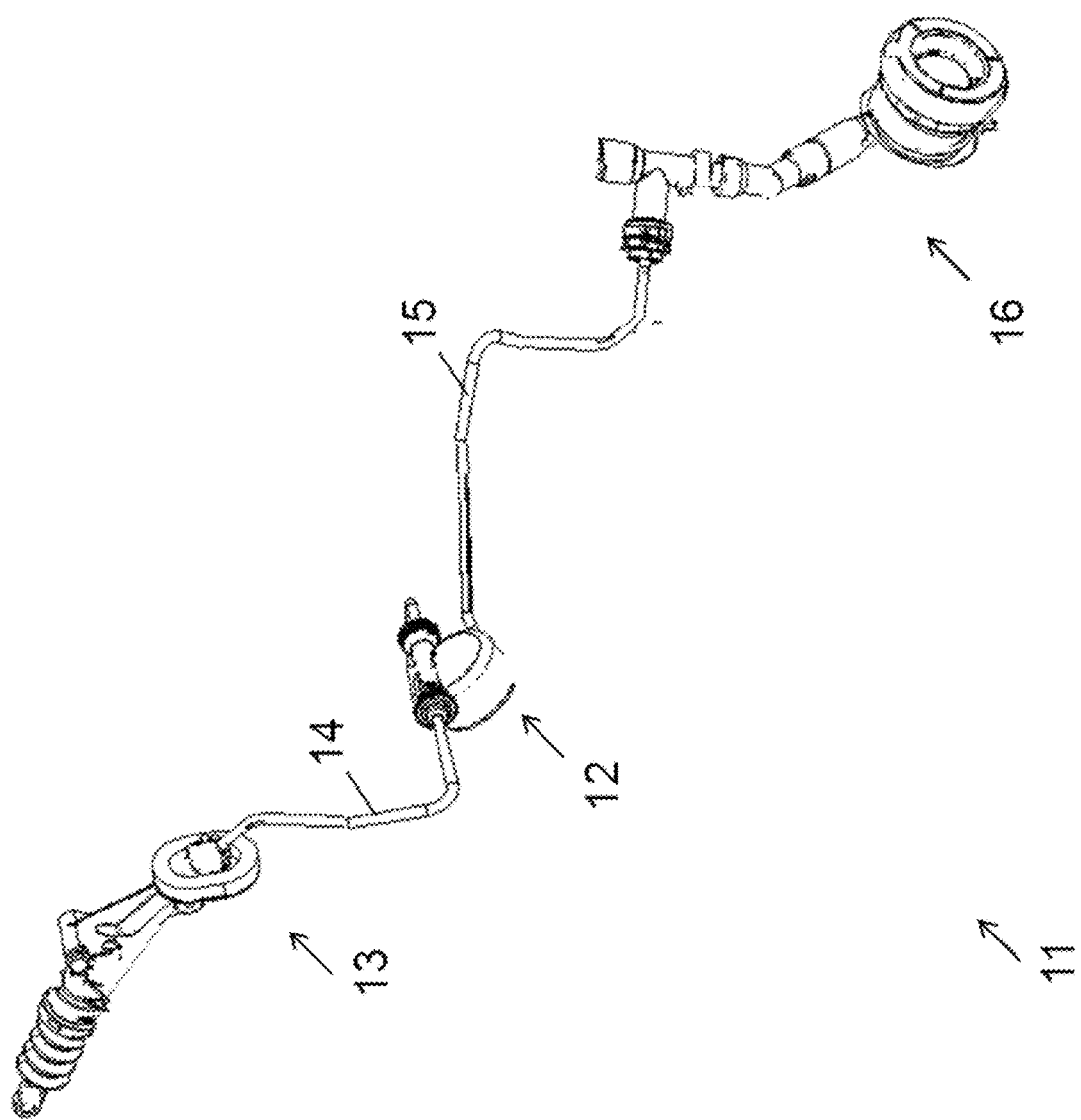
FIG. 2 shows a hydraulic actuator system comprising an inventive damper according to the present disclosure.

The following description relates to systems and components of a vibration damper used for attenuating engine vibration in a hydraulic actuator system. A hydraulic actuator system for actuating a motor vehicle clutch may comprise of a vibration damper of FIG. 2 that is positioned within the hydraulic line for damping engine vibration of the vehicle. The parts and components of the vibration damper of FIG. 2 are described in FIGS. 3-8. The hydraulic actuator system comprising a vibration damper may be included as part of an engine system of a vehicle shown in FIG. 9.

In an embodiment, the present disclosure discloses a vibration damper for a hydraulic clutch actuator system, the vibration damper comprising: a rigid housing comprising a chamber; an inlet port and an outlet port and a channel fluidly connecting the inlet port and the outlet port; a propeller comprising a plurality of blades, the propeller being rotatably mounted in said chamber; the chamber being fluidly connected with the channel in such a way that movement of fluid through the channel causes rotation of the propeller; a spiral torsion spring operatively connected to said propeller in such a way that rotation of the propeller causes winding or unwinding of the spring.

It is an advantage of this damper that it has a rigid housing which does not deform, and hence plays no significant role in damping of vibrations. It is an advantage of using a functionally coupled propeller and spring, because movement of fluid in the channel will cause rotation of the propeller, which in turn will cause the spring to be wound or unwound. This turning dampens movement of the fluid flow from the inlet to the outlet and vice versa (depending on whether a clutch pedal is being depressed or released). Further, this arrangement also dampens vibrations in said fluidic channel, e.g. vibrations originated from engine vibrations, which are transmitted via a hydraulic line towards a clutch pedal. The blades may all have the same shape and size, or some blades may have a different shape and size and orientation than others. This allows several degrees of freedom to fine-tune damping characteristics at the design stage.

According to a further embodiment of the present disclosure, the housing is a cylindrical housing having a circular cross section and having a bottom surface.

It is an advantage of a cylindrical housing that a distance between the blades and an inner wall of the cylindrical housing is relatively constant, which allows configuration of the blades with only a small spacing from said walls, thereby creating a larger resistance to movement.

According to a further embodiment of the present disclosure, the inlet port and outlet port are connected via a channel located under the chamber; and wherein the bottom surface has an elongated slit providing access to the channel, for fluidly connecting the channel and the chamber.

It is an advantage of this embodiment that fluid can flow largely unhindered from the inlet port to the outlet port, and vice versa, except that fluid movement through the channel "drags along" and rotates fluid present in the chamber. This dragging and rotation of the fluid causes the blades to absorb (relatively high frequency) vibration energy, and the spring to absorb (relative low frequency) energy.

According to another embodiment of the present disclosure, the bottom surface is a closed surface; and the inlet port and the outlet port are connected to a sidewall of the housing.

It is an advantage of this embodiment that fluid flowing through the damper from the inlet port to the outlet port or vice versa, deliberately contacts the blades of the propeller directly, rather than indirectly. Depending on the shape and size and orientation of the blades, the amount of contact with the blades, and hence, the degree of rotation of the propeller and the degree of winding of the spring can be determined.

According to a further embodiment of the present disclosure, the vibration damper further comprises a sealing element arranged between the propeller and the spiral torsion spring for preventing hydraulic liquid from coming into contact with the spring and to escape from the chamber. The vibration damper may further comprise a removable cap for providing access to the spring.

It is an advantage of the sealing element and the cap that it allows the spiral torsion spring to be easily replaced, e.g.

in a garage, without the risk that hydraulic fluid leaks. This allows fine-tuning of the damping characteristics of the device after the production stage, in a very simple way. This even allows fine-tuning of the damping characteristics according to personal preferences of each car owner.

According to a further embodiment of the present disclosure, the plurality of blades of the propeller are configured to have a predefined first vibration resonance frequency.

It is an advantage when the blades are configured (e.g., in shape, size, and/or orientation) according to a predefined damping characteristic having a first vibration resonance frequency, which is the frequency of maximum damping.

According to a further embodiment of the present disclosure, the plurality of blades comprise at least a first set of blades having a predefined first vibration resonance frequency, and a second set of blades having a predefined second vibration resonance frequency different from the first resonance frequency.

It is an advantage of this damper that it has two (or more) resonance frequencies, which allows the damping characteristics to be further fine-tuned.

According to a further embodiment of the present disclosure, the present disclosure also provides a hydraulic actuation system for a vehicle, the hydraulic actuation system comprising: a master cylinder connectable to a clutch pedal; a slave cylinder connectable to a clutch of a motor; a vibration damper as described above; a first hydraulic line connected between the master cylinder and an inlet port of the vibration damper; a second hydraulic line connected between an outlet port of the vibration damper and the slave cylinder.

The vibration damper may be suited for damping vibrations in such a hydraulic actuation system in order to reduce vibrations of the clutch pedal, and/or acoustical noise generated thereby, to a level which is imperceptible by the driver.

FIG. 2 shows a hydraulic actuator system 11 according to the present disclosure. The hydraulic system 11 comprises a damper 12 according to the present disclosure. The system further comprises a master cylinder 13, connected via a first hydraulic line 14 to the damper device 12, which is also connected via a second hydraulic line 15 to a slave cylinder 16. The master cylinder 13 may include a piston rod (not shown) connected to a clutch pedal (not shown). In one example, when the clutch pedal is depressed by the vehicle operator (e.g., the driver), the piston moves into the master cylinder 13, which further causes a hydraulic fluid movement from the master cylinder to slave cylinder 16. The focus of the present disclosure is on the damper device 12 arranged between the master cylinder 13 and the slave cylinder 16.

Figure 3:
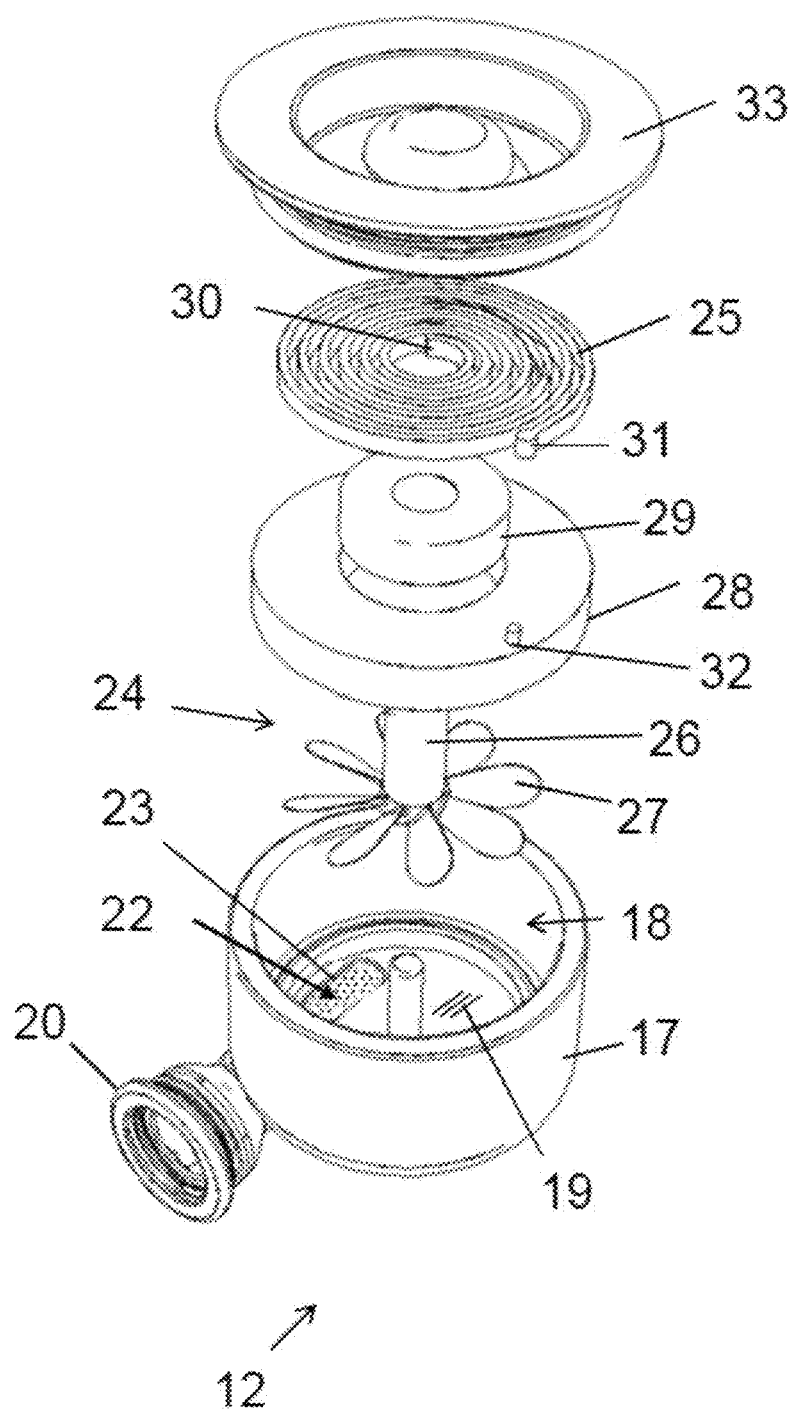
FIG. 3 shows an exploded view of a first embodiment of the inventive damper according to the present disclosure.

FIG. 3 shows an exploded view of a first embodiment of the damper 12 according to the present disclosure. The vibration damper 12 comprises a rigid housing 17 delimiting a hollow chamber 18. The housing 17 has a cylindrical wall and has a bottom wall 19. Herein, "rigid" may be defined as "stiff", meaning that deformation of the housing 17 does not have a significant influence on the damping characteristics. The damper device 12 further comprises an inlet port 20 and an outlet port 21 (not visible in FIG. 3, but see FIG. 5) connected by a channel 22 for allowing passage of a hydraulic fluid from the master cylinder to the slave cylinder.

In the embodiment of the vibration damper 12 shown in FIG. 3, the channel 22 is located "below" the bottom wall 19 of the housing 17, but the channel 22 is in fluid communication with the chamber 18 via a longitudinal slit 23 provided in the bottom wall 19, also forming an opening of the channel 22.

According to an aspect of the present disclosure, the vibration damper 12 further comprises a propeller 24 operatively connected to a spiral torsion spring 25.

The propeller 24 is typically made of metal sheet, for example stainless steel, aluminum or an aluminum alloy, and is mounted on a rotatable shaft 26. The propeller 24 has a number of blades 27, for example eight blades, but propellers with less than eight blades or more than eight blades can also be used.

The spiral torsion spring 25 is functionally connected to the propeller 24 in such a way that rotation of the propeller 24 causes the spring to either wind up (when rotating in a first direction), or to unwind (when rotating in the opposite direction). Large movements of hydraulic fluid in the channel 22 due to the clutch pedal being depressed will cause rotation of the propeller 24, which in turn causes energy to be stored in the spring 25. Large movements of hydraulic fluid in the channel 22 due to the clutch pedal being released, will also cause rotation of the propeller 24, but in an opposite direction, and will cause energy to be released from the spring 25. Furthermore, when the propeller 24 rotates, energy is absorbed by the spring 25 due to friction loss.

Small movements of hydraulic fluid, due to motor vibrations, even when the clutch pedal is stationary, will cause small movements of the propeller blades 27, but this vibration energy will be mainly dissipated in one or more of the following ways: by bending of the blades, turbulent movements of the hydraulic fluid in the chamber 18, and dissipation of energy by the spring 25.

The damper device 12 further comprises a sealing element 28, which is fixedly mounted inside the housing 17, above the propeller 24. In the example of FIG. 3, the sealing element 28 has an annular shape.

The damper device 12 shown in FIG. 3 further comprises a bearing 29, e.g. a ball bearing, for holding the rotatable shaft 26 on which the propeller 24 is mounted. The shaft 26 has an upper end extending on top of the bearing 29. This upper end is connected to one end 30 of the spiral torsion spring 25. The other end 31 of the spiral torsion spring 25 is connected to a protrusion 32 on the annular sealing element 28.

The sealing element 28 and the bearing 29 are arranged such that no hydraulic fluid can escape from the housing 17.

The housing 17 is closed on an upper side by a cap 33, for example to avoid dust. The cap 33 may be made of a plastic material which is clamped against an inner surface of the housing 17. Alternatively, the cap 33 may be made of metal material with a threaded portion for engaging a corresponding threaded portion of the housing 17, but other materials or connection mechanisms (e.g. based on a groove and a protruding rim) may also be used.

It is noted that this closing does not need to be a sealing of the hydraulic fluid, and the damper 13 would still work even without this cap 33. Indeed, according to an aspect of the present disclosure, the cap 33 may be removed in the field, e.g. in a garage, and the existing spiral torsion spring 25 may be replaced by another torsion spring, having different characteristics, e.g. made of a different material, having a larger or smaller thickness, a larger or smaller diameter, a larger or smaller height, fewer or more windings, etc. In this way, the damping characteristics of the damper device 13 may be fine-tuned to specific customers, long after the production stage. Easy tuning of the damper stiffness allows modifying the damper depending on the actual vibrations, e.g. vibration type, frequency and amplitude. Assuming that a particular customer is sensitive to vibrations in a particular frequency range, e.g. between 0.5 Hz to 50 Hz frequency range, then a suitable spring 25 for damping these particular frequencies may easily be installed.

The sealing element 28 makes sure that no or no significant amount of hydraulic fluid can escape from the hydraulic system during such replacement of the spring 25.

Figure 4:
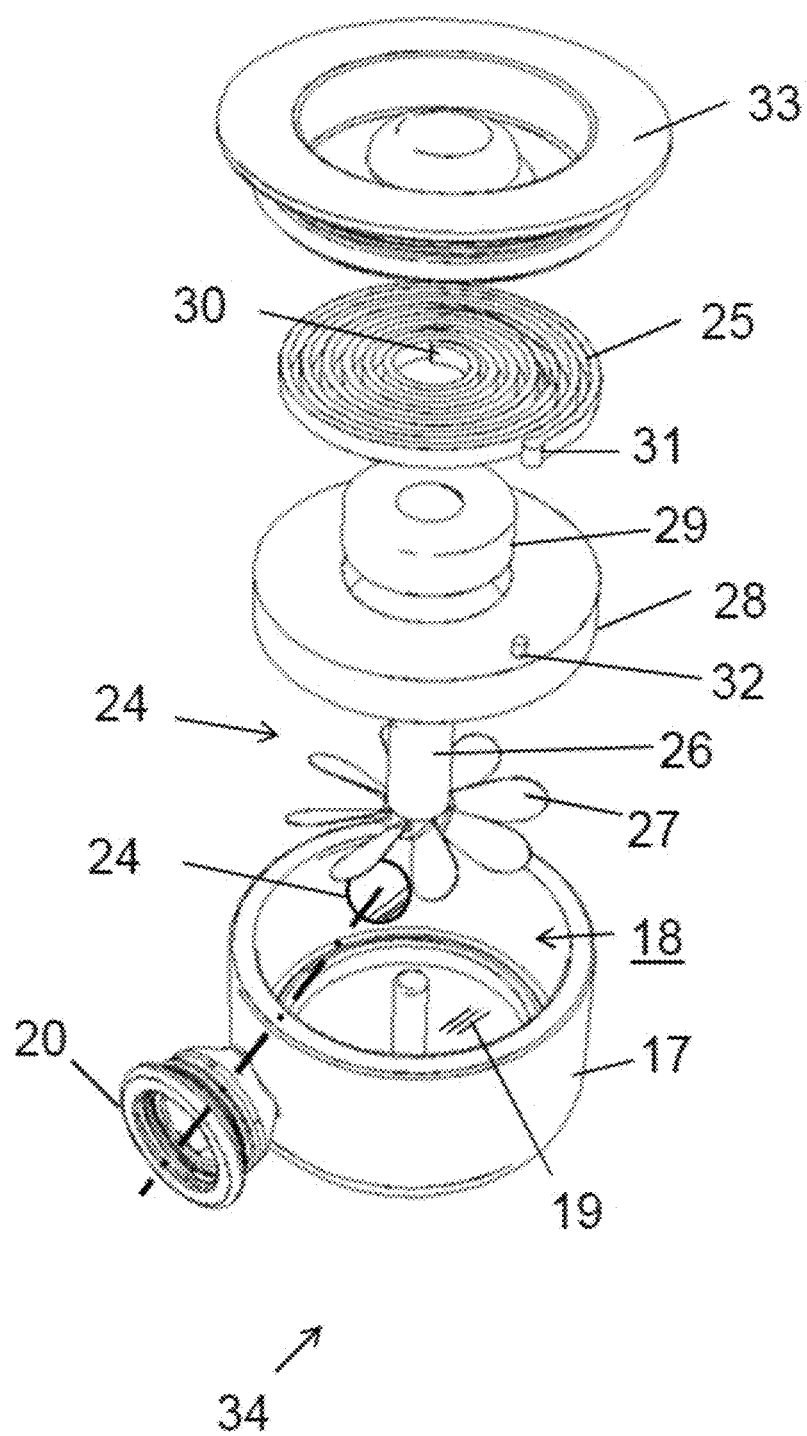
FIG. 4 shows an exploded view of a second embodiment of the inventive damper according to the present disclosure.

FIG. 4 shows an exploded view of a second embodiment of a damper 34 according to the present disclosure.

The main structural difference between this damper device 34 and the damper device 12 shown in FIG. 3 is that the inlet port 20 and the outlet port 21 are connected to a side wall of the housing 17 (not to a channel 22 below the bottom), and that the chamber 18 fluidly connects the inlet port 20 and the outlet port 21.

The main behavioral difference between the device 34 shown in FIG. 4 and the device 12 shown in FIG. 3 is that a flow of the hydraulic fluid now passes completely through the chamber 17, which allows for a much larger influence on the rotation of the propeller 24. The amount of influence can be determined by choosing an appropriate shape and size and orientation of the propeller blades 27.

Stated in other words, the devices of FIG. 3 and FIG. 4 work as follows:

The propeller blades 27 act as a first stage damper; each contact between hydraulic fluid and propeller blades 27 absorbs energy, hence vibration energy between the slave cylinder 16 (see FIG. 2) and the master cylinder 13 will be reduced.

During the way back of the fluid stream (from the slave cylinder 16 to the master cylinder 13, when the clutch pedal is released), the spiral spring 25 may have a positive effect on pedal effort characteristics, for example, by releasing the residual storage energy when it unwinds. Therefore, pedal return ability concern, especially during cold weather, may be eliminated.

The use of a spiral torsion spring has geometrical advantages in terms of package compared to other types of springs (helical, conical, leaf, etc.).

As soon as there is a movement within the hydraulic fluid, the propeller 24 may rotate and squeeze/loosen the spiral torsion spring 25. Therefore the damper 12, 34 will not only work when the clutch pedal is being depressed or being released, but also when there is a pressure wave coming from the engine side, caused by engine vibrations, even when the pedal is stationary.

The housing 17 and the sealing element 28 delimit chamber 18 which is connected via a first hydraulic line 14 (see FIG. 2) between a master cylinder 13 and via a second hydraulic line 15 with the slave cylinder 16, so that the spring 25 can be hydraulically wound-up or unwound by movements of the fluid column between the master cylinder 13 and the slave cylinder 16.

According to the present disclosure the propeller 24 rotates, at least in the rest state of the hydraulic force transfer system, by the spring 25 against the direction of the hydraulic pressure on the propeller blades 24 against a chamber-side support surface. Depending on the flow direction (pressing or releasing the clutch pedal), the propeller 24 will rotate and will wind-up or unwind the spiral torsion spring.

When the clutch pedal is depressed, fluid will enter the chamber 18 and squeeze the propeller first until the pressure level reaches the same pressure level as that on the slave cylinder side. Depending on the spring characteristic (maximum permitted torque, number of coils, material thickness, etc.) the level of depreciation can be arranged, and once the damper has reached a higher level, fluid starts to overcome the force on the slave cylinder side.

The device may further comprise an actuation mechanism for preventing the propeller 24 to rotate in the reverse direction. As long as the clutch pedal is depressed, positive hydraulic pressure does not allow such reverse movement. Until the clutch pedal is released, pressure is exerted on the propeller blades 27. The profile of the blades 27 can be chosen to influence the flow routing.

The damper also absorbs vibration energy, because movement of the propeller 24 translates into compression/decompression of the spring, and the spring absorbs some of this energy by friction loss in a manner similar to a membrane and spring combination.

Figure 5:
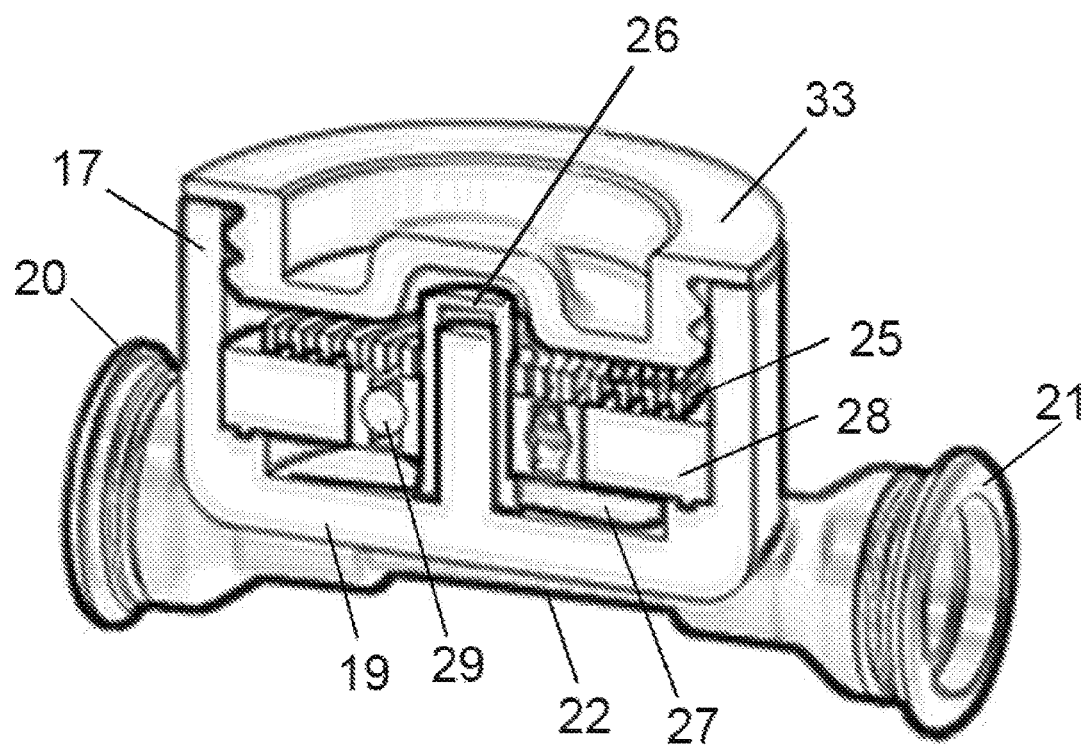
FIG. 5 shows a 3D cut-away view of the damper of FIG. 3.

FIG. 5 shows a 3D cut-away view of the damper 12 of FIG. 3, showing the relative position of the channel 22 between the inlet port 20 and the outlet port 21. The channel 22 is located below a bottom surface 19 of the housing 17, but is fluidly connected to the chamber 18 via an elongated slit (not visible in FIG. 5, but visible in FIG. 3 and FIG. 7). Two blades 27 of the propeller are shown. The propeller 24 is mounted on a rotatable shaft 26, which may be mounted on a pen protruding from the bottom 19. A bearing 29 is arranged around the shaft 26. An annular sealing element 28 surrounds the bearing 29 and prevents hydraulic fluid from leaving the chamber 18. The shaft 26 protrudes on top of the annular sealing element 28, and is connected to one end of a spiral torsion spring 25. A second end 31 of the torsion spring 31 (not visible in FIG. 5, but see FIG. 3) engages a protrusion 32 of the sealing element 28. This allows easy replacement of the spring 25 in the field, if so desired. A cap 33, e.g. a rubber or metal cap 33, closes the housing 17, but since the hydraulic fluid cannot pass the bearing 29 and the sealing element 28, it cannot reach the spring 25. Therefore the cap 33 does not need to be closed with an O-ring or the like, although it may.

Figure 6:
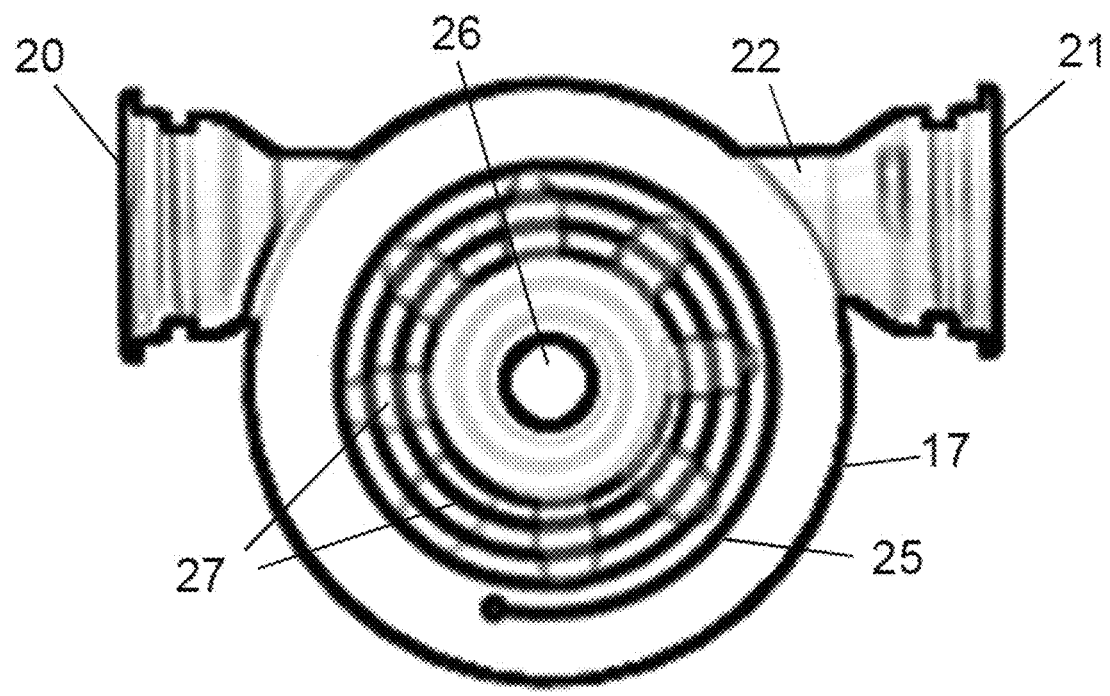
FIG. 6 shows a top view of the damper of FIG. 3 in an assembled state, after removal of the cap, and with the sealing element made transparent for illustrative purposes.

FIG. 6 shows a top view of the damper of FIG. 3 in an assembled state, after removal of the cap 33, and with the sealing element 28 made transparent for illustrative purposes. This drawing shows that the channel 22 is located eccentrically with respect to the housing 17. The drawing also shows the relative position of the blades 27 with respect to the channel 22, and with respect to the spring 25.

Figure 7:
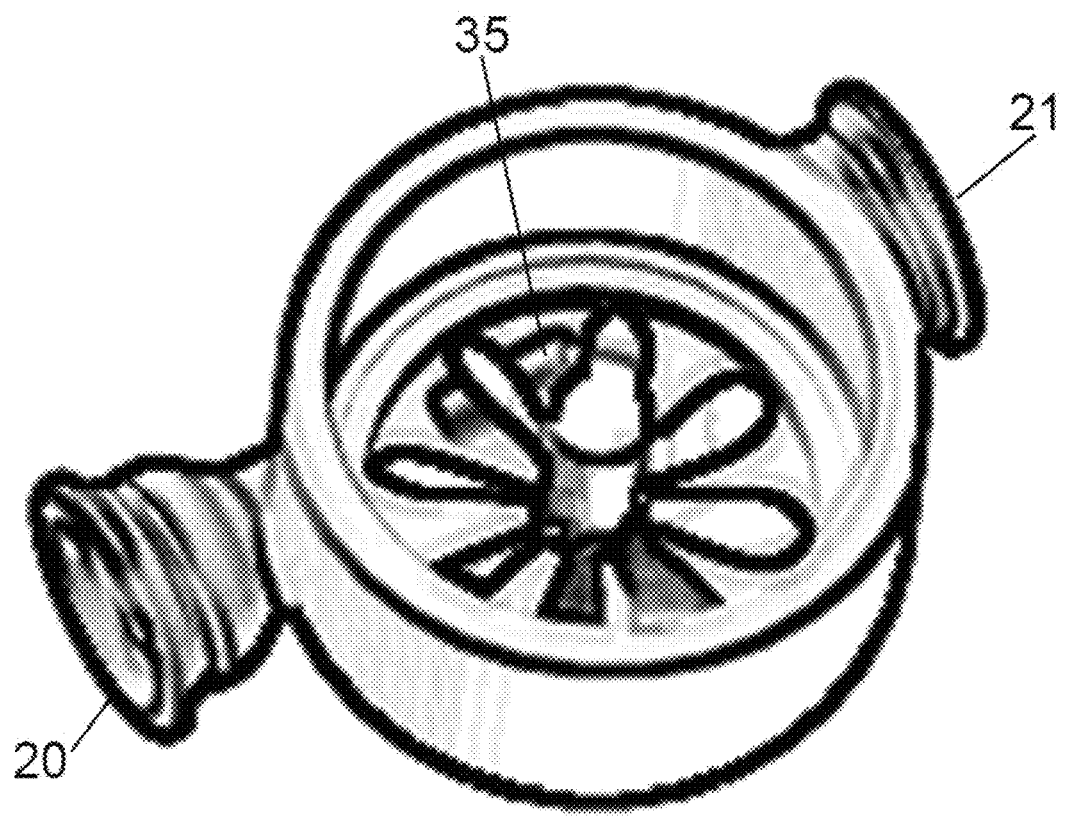
FIG. 7 is a perspective top view of the damper housing of FIG. 3, and a propeller mounted in the housing.

FIG. 7 is a perspective view of the housing 17 of the damper 12 shown in FIG. 3, after the propeller 24 is inserted in the chamber. Visible is the elongated slit 23 (described in FIG. 3) forming an opening 35 between the channel 22 (described in FIG. 3), which is located between the inlet port 20 and outlet port 21.

Figure 8:
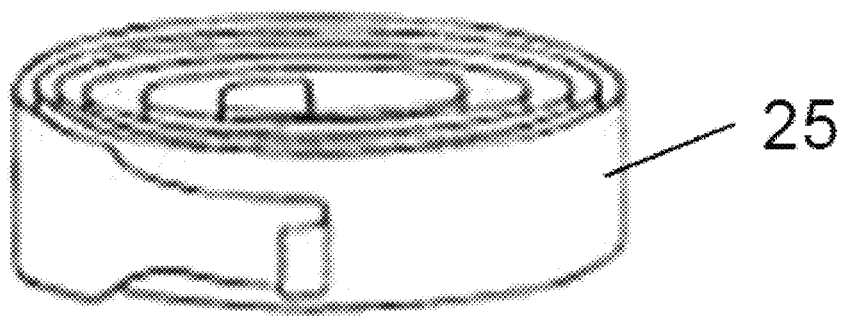
FIG. 8 is an example of a torsion spring as can be used in embodiments of the damper according to the present disclosure.

FIG. 8 is an example of a spiral torsion spring 25 as may be used in the damper device 12 of FIG. 13 and in the damper device 34 of FIG. 4. Thus, it may be relatively easy to replace spring 25 by another spring to fine-tune the vibration frequency characteristics of the device.

Figure 9:
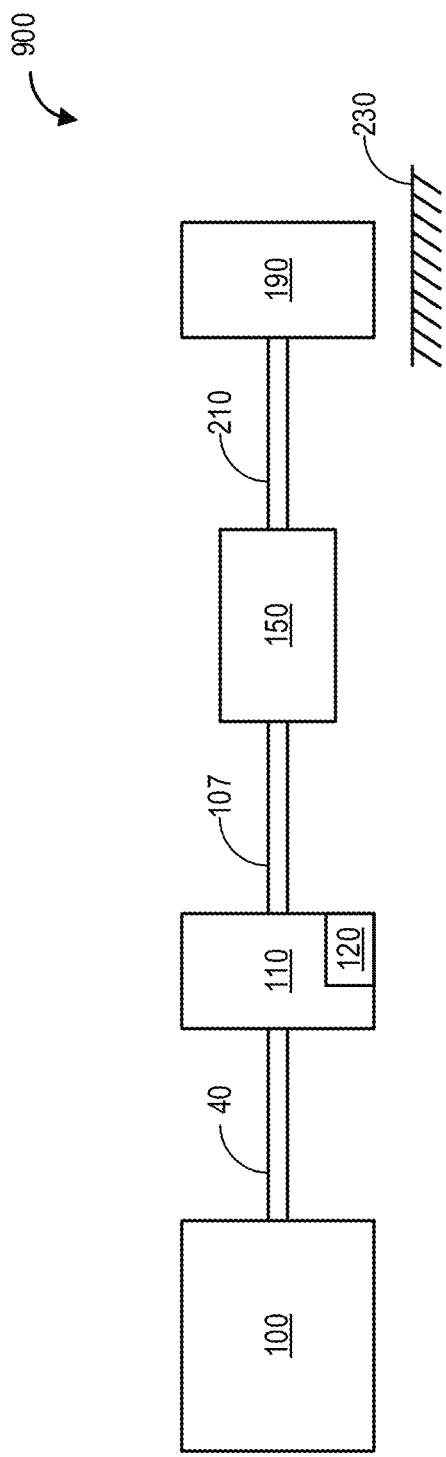
FIG. 9 is a block diagram of a vehicle with a manual transmission coupled to the hydraulic actuator system of FIG. 2.

Referring to FIG. 9, a vehicle engine system 900 is shown. Vehicle engine system 900 includes an internal combustion engine 100, a clutch 110 and a transmission 150. The clutch 110 selectively couples the engine 100 via crankshaft 40 and transmission 150 (via turbine shaft 107) to transfer drive torque from the engine 100 to the transmission 150 to drive the vehicle.

Transmission 150, in the example of FIG. 9, is a manual transmission having a number of selectable gears (not shown), which can be selectively engaged in different ratios to increase or decrease the rotational speed of the vehicle via clutch 110.

Clutch 110 may be controlled by a hydraulic actuator system, such as the hydraulic actuator system described in FIG. 2, configured to selectively operate clutches that are associated with the various gears. The hydraulic actuator system directs hydraulic fluid to and from the clutch system in order to engage or disengage a clutch from a flywheel (not shown), which is connected to crankshaft 40. Furthermore, a vibration damper 120 (similar to vibration damper 12 or 34 in FIGS. 2-4) may be coupled to the hydraulic line of the hydraulic actuator system of clutch 110.

Transmission 15 may further be coupled to tire 190 via axle 210. Tire 190 interfaces the vehicle (not shown) to the road 230. While various vehicle configurations may be used, in one example, the engine is the sole motive power source, and thus the vehicle is not a hybrid-electric, hybrid-plug-in, etc. In other embodiments, the method may be incorporated into a hybrid vehicle.

In an embodiment the vibration damper according to the present disclosure may be used in a hydraulic actuation system for a vehicle.

It should be noted that the individual features listed in the description below can be combined in any technically meaningful way with each other and show further embodiments of the disclosure. The description of the disclosure is additionally characterized and specified particularly in connection with the figures.

In this way, the vibration generated by the engine may be attenuated by the inventive vibration damper. Furthermore, the amplitude and vibration frequency range of the vibration damper may be readily adjusted according to the user preference. Technical effect of attenuating vibration in the engine system via vibration damper is to reduce undesired NVH-related issues and thus, enabling improved engine performance.

In one embodiment, a vibration damper for a hydraulic clutch actuator system, comprises: a rigid housing comprising a chamber; an inlet port and an outlet port and a channel fluidly connecting the inlet port and the outlet port; a propeller comprising a plurality of blades, the propeller being rotatably mounted in said chamber; the chamber being fluidly connected with the channel in such a way that movement of fluid through the channel causes rotation of the propeller; a spiral torsion spring operatively connected to said propeller in such a way that rotation of the propeller causes winding or unwinding of the spring. In a first example of the system, the housing is a cylindrical housing having a circular cross section and having a bottom surface. A second example of the system optionally includes the first example, and further includes wherein the inlet port and outlet port are connected via the channel located under the chamber; wherein the bottom surface has an elongated slit providing access to the channel, for fluidly connecting the channel and the chamber. In a third example of the system optionally includes one or more or each of the first through second examples, and further includes wherein the bottom surface is a closed surface; and wherein the inlet port and the outlet port are connected to a sidewall of the housing. In a fourth example of the system optionally includes one or more or each of the first through third examples, and further comprises: a sealing element arranged between the propeller and the spiral torsion spring for preventing hydraulic liquid to come into contact with the spring and to escape from the chamber; and a removable cap for providing access to the spring. In a fifth example of the system optionally includes one or more or each of the first through fourth examples, and further includes, wherein the plurality of blades of the propeller are configured to have a predefined first vibration resonance frequency. In a sixth example of the system optionally includes one or more or each of the first through fifth examples, and further includes, wherein the plurality of blades comprise at least a first set of blades having a predefined first vibration resonance frequency, and a second set of blades having a predefined second vibration resonance frequency different from the first resonance frequency.

In another embodiment, a hydraulic actuation system for a vehicle, comprises: a master cylinder connectable to a clutch pedal; a slave cylinder connectable to a clutch of a motor; a vibration damper comprising: a rigid housing delimiting a hollow chamber; an inlet port and an outlet port connected by a channel configured to pass a hydraulic fluid from the master cylinder to the slave cylinder; a propeller operatively mounted on a rotatable shaft and connected to a spiral torsion spring to allow rotation of the said spring; and a sealing element fixed inside the housing and mounted above the propeller; a first hydraulic line connected between the master cylinder and the inlet port of the vibration damper; a second hydraulic line connected between the outlet port of the vibration damper and the slave cylinder. In a first example of the system, the system further includes wherein the spiral torsion spring is connected to the propeller in such a way that rotation of the propeller causes the spring to wind up when the propeller is rotating in a first direction and causes the spring to unwind when the propeller is rotating in a second direction. In a second example of the system optionally includes the first example, and further includes, wherein the sealing element has an annular shape. In a third example of the system optionally includes one or more or each of the first through second examples, and further includes, wherein the spring has one end connected to an upper side of the rotatable shaft and another end connected to a protrusion on the sealing element. In a fourth example of the system optionally includes one or more or each of the first through third examples, and further comprises, a removable cap that is made of metal material with a threaded portion for engaging a corresponding threaded portion of the housing.

In another embodiment, a vibration damper system arranged between a master cylinder and a slave cylinder of a hydraulic actuator system, comprises: an inlet port that connects the master cylinder via a first hydraulic line; an outlet port that connects the slave cylinder via a second hydraulic line; wherein the first and second hydraulic lines are configured to provide movement of hydraulic fluid between the master cylinder and the slave cylinder; a housing comprising a cylindrical wall and a bottom wall and enclosing a hollow chamber; a propeller comprising of a plurality of blades mounted on a rotatable shaft held via a first bearing; the rotatable shaft comprising of an upper end connected to a second bearing; a spiral torsional spring connected to the propeller via the second bearing; a sealing element arranged between the propeller and the spring such that hydraulic fluid is in direct contact with the propeller but not the spring; and a removable cap positioned on an upper side of the housing. In a first example of the system, the system further includes wherein the spring is configured to be hydraulically wound-up thereby absorbing energy when the hydraulic fluid moves in a first direction. In a second example of the system optionally includes the first example, and further includes, wherein the spring is configured to be unwound thereby releasing energy when the hydraulic fluid moves in a second direction, in an opposite direction as the first direction. In a third example of the system optionally includes one or more or each of the first through second examples, and further includes, wherein the spring is configured to move in an opposite direction of the hydraulic fluid which exerts hydraulic pressure on the propeller blades. In a fourth example of the system optionally includes one or more or each of the first through third examples, and further includes, wherein the spring is configured to have one end removably connected to the upper side of the rotatable shaft and to have another end removably connected to a protrusion on the sealing element. In a fifth example of the system optionally includes one or more or each of the first through fourth examples, and further includes, wherein the propeller is rotatable via a pressure wave coming from an engine vibration. In a sixth example of the system optionally includes one or more or each of the first through fifth examples, and further includes, wherein the movement of the hydraulic fluid depends on the position of a clutch pedal connected to the master cylinder. In a seventh example of the system optionally includes one or more or each of the first through sixth examples, and further includes, wherein the hydraulic fluid moves from the master cylinder to the slave cylinder when the clutch pedal is pressed; and wherein the hydraulic fluid moves from the slave cylinder to the master cylinder when the clutch pedal is released.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vibration damper for a hydraulic clutch actuator system, comprising:
   a rigid housing comprising a chamber;
   an inlet port and an outlet port and a channel fluidly connecting the inlet port and the outlet port, where the inlet port is fluidly connected to a first cylinder in the hydraulic clutch actuator system and the outlet port is fluidly connected to a second cylinder in the hydraulic clutch actuator system;
   a propeller comprising a plurality of blades, the propeller being rotatably mounted in said chamber;
   the chamber being fluidly connected with the channel in such a way that movement of a fluid through the channel causes rotation of the propeller;
   a spiral torsion spring rotationally connected to the propeller and configured to dampen vibrational frequencies propagating through the fluid.

2. The vibration damper according to claim 1, wherein the rigid housing is a cylindrical housing having a circular cross section and having a bottom surface.

3. The vibration damper according to claim 2, wherein the inlet port and the outlet port are connected via the channel located under the chamber; wherein the bottom surface has an elongated slit providing access to the channel, for fluidly connecting the channel and the chamber.

4. The vibration damper according to claim 2, wherein the bottom surface is a closed surface; and wherein the inlet port and the outlet port are connected to a sidewall of the rigid housing.

5. The vibration damper according to claim 1, further comprising:
   a sealing element arranged between the propeller and the spiral torsion spring for preventing hydraulic liquid from coming into contact with the spiral torsion spring and to escape from the chamber; and
   a removable cap for providing access to the spiral torsion spring.

6. The vibration damper according to claim 1, wherein the plurality of blades of the propeller are configured to have a predefined first vibration resonance frequency.

7. A hydraulic actuation system for a vehicle, comprising:
   a master cylinder connectable to a clutch pedal;
   a slave cylinder connectable to a clutch of a motor;
   a vibration damper comprising:
      a rigid housing delimiting a hollow chamber;
      an inlet port and an outlet port connected by a channel configured to pass a hydraulic fluid from the master cylinder to the slave cylinder;
      a propeller operatively mounted on a rotatable shaft and connected to a spiral torsion spring to allow rotation of the spiral torsion spring and dampen vibrational frequencies in a selected frequency range; and
      a sealing element fixed inside the rigid housing and mounted above the propeller;
      a first hydraulic line connected between the master cylinder and the inlet port of the vibration damper;
      a second hydraulic line connected between the outlet port of the vibration damper and the slave cylinder.

8. The hydraulic actuation system of claim 7, wherein the spiral torsion spring is connected to the propeller in such a way that rotation of the propeller causes the spiral torsion spring to wind up when the propeller is rotating in a first direction and causes the spiral torsion spring to unwind when the propeller is rotating in a second direction.

9. The hydraulic actuation system of claim 7, wherein the sealing element has an annular shape.

10. The hydraulic actuation system of claim 7, wherein the spiral torsion spring has one end connected to an upper side of the rotatable shaft and another end connected to a protrusion on the sealing element.

11. The hydraulic actuation system of claim 7, further comprising, a removable cap that is made of metal material with a threaded portion for engaging a corresponding threaded portion of the rigid housing.

12. A vibration damper system arranged between a master cylinder and a slave cylinder of a hydraulic actuator system, comprising:
    an inlet port that connects the master cylinder via a first hydraulic line;
    an outlet port that connects the slave cylinder via a second hydraulic line;
        wherein the first and second hydraulic lines are configured to provide movement of a hydraulic fluid between the master cylinder and the slave cylinder;
        a housing comprising a cylindrical wall and a bottom wall and enclosing a hollow chamber;
    a propeller comprising a plurality of blades mounted on a rotatable shaft held via a bearing;
    the rotatable shaft comprising an upper end;
    a spiral torsional spring connected to the propeller via the rotatable shaft and configured to dampen vibrational frequencies in a selected frequency range;
    a sealing element arranged between the propeller and the spiral torsional spring such that the hydraulic fluid is in direct contact with the propeller but not the spiral torsional spring; and
    a removable cap positioned on an upper side of the housing.

13. The vibration damper system of claim 12, wherein the spiral torsional spring is configured to be hydraulically wound-up thereby absorbing energy when the hydraulic fluid moves in a first direction.

14. The vibration damper system of claim 13, wherein the spiral torsional spring is configured to be unwound thereby releasing energy when the hydraulic fluid moves in a second direction opposite the first direction.

15. The vibration damper system of claim 12, wherein the spiral torsional spring is configured to move in an opposite direction of the hydraulic fluid which exerts hydraulic pressure on the plurality of blades.

16. The vibration damper system of claim 12, wherein the spiral torsional spring is configured to have one end removably connected to the upper side of the rotatable shaft and to have another end removably connected to a protrusion on the sealing element.

17. The vibration damper system of claim 12, wherein the propeller is rotatable via a pressure wave coming from an engine vibration.

18. The vibration damper system of claim 12, wherein the movement of the hydraulic fluid depends on a position of a clutch pedal connected to the master cylinder.

19. The vibration damper system of claim 18, wherein the hydraulic fluid moves from the master cylinder to the slave cylinder when the clutch pedal is pressed; and
    wherein the hydraulic fluid moves from the slave cylinder to the master cylinder when the clutch pedal is released.

* * * * *